United States Patent [19]
Soble

[11] Patent Number: 5,944,015
[45] Date of Patent: Aug. 31, 1999

[54] DEVICE TO AID IN READING MAMMOGRAMS

[76] Inventor: Marc G. Soble, 8275 Fishel Creek Rd., Seven Valleys, Pa. 17360-9039

[21] Appl. No.: 09/094,375

[22] Filed: Jun. 10, 1998

Related U.S. Application Data

[60] Provisional application No. 60/054,143, Jul. 29, 1997.

[51] Int. Cl.$^6$ .................................................. A61F 5/37
[52] U.S. Cl. .......................................... 128/846; 359/601
[58] Field of Search .................................. 128/845, 846, 128/849–858; 359/601

[56] References Cited

U.S. PATENT DOCUMENTS

| | | |
|---|---|---|
| 2,227,944 | 1/1941 | Mayne . |
| 3,791,722 | 2/1974 | Ahlberg et al. . |
| 3,857,630 | 12/1974 | Gonzalez . |
| 4,059,347 | 11/1977 | Eitel . |
| 5,212,596 | 5/1993 | Andrus . |
| 5,247,391 | 9/1993 | Gormley . |
| 5,369,332 | 11/1994 | Droscha . |
| 5,543,967 | 8/1996 | Robson . |

FOREIGN PATENT DOCUMENTS 533496  2/1947  United Kingdom .

*Primary Examiner*—Michael A. Brown
*Attorney, Agent, or Firm*—Richard C. Litman

[57] ABSTRACT

A flat rigid plate having a specialized contoured shape that allows it to best fit the contoured x-ray pattern generated by the different breast tissues on both mediolateral oblique view and craniocaudal view mammogram films. A lower, larger portion of the plate is shaped in the fashion of the lower portion of a spade, with bilaterally symmetrical lobes and a flared stem. An upper, smaller portion of the plate is trapezoidal shaped, having rounded corners. A medical professional examining a mammogram uses the stem as a handle while positioning the plate so that it obscures certain parts of the mammogram. The shape of the plate enables the medical professional to cover any of the film representing the more radiopaque breast tissues that would otherwise present photographic contrast and adversely affect the viewing of a breast tissue area chosen for examination.

7 Claims, 9 Drawing Sheets

DEVICE TO AID IN READING MAMMOGRAMS

CROSS-REFERENCE TO RELATED APPLICATION

This application claims the benefit of U.S. Provisional Patent Application Ser. No. 60/054,143, filed Jul. 29, 1997.

BACKGROUND OF THE INVENTION

1. Field of the Invention

The present invention relates to light-blocking devices and, more specifically, to a shield contoured for use with mammogram x-ray films, where the shield is used to block light transmission of lighter areas on the film to promote better viewing of darker areas on the film.

2. Description of the Invention Art

Radiological techniques, especially x-rays, exist as effective and reliable diagnostic tools having a wide range of medical applications. Mammography is one such application where x-ray photographic films of the breasts are taken for interpretive analysis and diagnosis of possible disease or abnormalities. Specifically, the process involves exposing a piece of film to x-rays that have been passed through the tissues of the breast. The different kinds of breast tissue have different affinities for the x-ray radiation, and therefore absorb different amounts of the x-ray radiation. When the x-rays pass through the breast tissues and expose the film, the degree of exposure, or darkness, is proportional to the amount of radiation absorbed by the different breast tissues. The resulting image, or mammogram, produced yields important information regarding the presence or absence of breast cancer, which may selectively absorb more radiation than normal breast tissues.

Two views of the breasts are typically obtained during an examination. The craniocaudal view provides a view of each breast from above, or a "bird's eye" view. The mediolateral oblique view provides a side, profile view of each breast. A physician or radiologist views the films by placing them on a viewbox, where fluorescent light shines through the film to the examiner's eyes. Depending on the density of the object between the x-ray source and the film, which varies with the tissue types present in the breast, various features of breast disease can be recognized. Often, films of the right and left breast are hung "back-to-back." This arrangement facilitates disease recognition, as both breasts are relatively symmetrical and any difference therebetween can be detected and assessed as a possible abnormality.

On mammograms cancers typically appear as stellate masses with spiculated margins, but they may also appear as clusters of microcalcifications, with or without a stellate mass. It may sometimes be difficult to distinguish a tumor from a benign cyst, which may appear as a mass with a smooth border, or with benign fibroadenomas, which may contain dense popcorn-like calcifications, or with lymph nodes. Mammograms are difficult to interpret, and may be double read (read independently by two different radiologists). While a negative mammogram cannot rule out breast cancer, a properly read mammogram can detect a cancer when it is very small, even before they can be detected by palpation.

A problem arises when the physician or radiologist hangs the mammogram film on the viewbox. Areas of excessive photographic contrast occur throughout the mammogram film. While the areas representing the subcutaneous and retroglandular tissues are darker (more radiolucent), the glandular and axilla areas are lighter (more radiopaque). Evaluation of dark areas next to light areas is very difficult, as the pupil adjusts to the light areas and thereby makes accurate visualization of the dark areas difficult, time-confusing and frustrating for the physician or radiologist.

Unsatisfactory solutions to this problem have included removing the films from the viewbox to hold them up to brighter light and using a make-shift shield, such a medical chart or a writing tablet, to cover the lighter parts of the film. Such tactics are further complicated by uneven room lighting or by the disparity between the straight edges of the object used as a make-shift shield and the contoured x-ray pattern generated by the different breast tissues. Also, these methods have an unprofessional appearance which may be of medical concern to a patient, especially in unclear cases, where an accurate reading of the mammogram films is critical.

U.S. Pat. No. 2,227,944 discloses an anti-glare shield adapted for viewing x-ray films. The shield comprises a pair of connected complementary shield elements, each having a handle and defining a vision opening. These shield elements are pivotally assembled with means for urging them into a position in which the vision openings are in alignment, so as to isolate a specific area on the film from those surrounding it, and to enable a physician to better examine that area. While useful with orthopedic- and vascular-related x-ray films, the device of '944, with its vision openings, lacks the contoured shape necessary for examination of mammogram films. The device requires time to adjust the opening to a convenient viewing size, and the vision opening is too small to simultaneously view areas along the sweeping contour of the breast. Furthermore, the small vision openings of the device of '944 do not provide a sufficient area for the examiner to compare the right and left breasts, as required to check for non-symmetrical irregularities that would indicate disease. In this sense, the device of '944 does not work with mammogram films.

Other less relevant inventions and patents include the vehicle anti-glare shield of U.S. Pat. No. 3,857,630, the nonreflective articles of U.S. Pat. No. 5,212,596, the automobile glare shield of U.S. Pat. No. 5,247,391, the computer monitor shield of U.S. Pat. No. 5,369,332 and the book shade apparatus of U.S. Pat. No. 5,543,967. Also of limited relevance to the present invention are the goggle lenses of U.S. Pat. No. 3,791,722, the optical instrument training device of U.S. Pat. No. 4,059,347 and the welding face guard of British Patent No. 533,496.

Given the shortcomings of the above inventions and patents, there is a need for a device that facilitates accurate reading of mammogram films. There is also a need for a device that eliminates the contrast created by lighter portions of the mammogram x-ray film so that an examiner can better view the darker portions. There is a further need for a device that has a contoured shape to better fit the contoured x-ray pattern generated by the different breast tissues. There is still a further need for a film-viewing aid that allows comparative bilateral image assessment in mammogram films of right and left breasts for detection of unsymmetrical irregularities.

None of the above inventions and patents, taken either singly or in combination, is seen to describe the instant invention as claimed.

SUMMARY OF THE INVENTION

Areas of excessive photographic contrast occur throughout a mammogram film, making accurate visualization of the dark areas difficult, time-confusing and frustrating for the medical professional who examines the films. This problem is of significant medical concern, especially in unclear cases, where an accurate reading of the mammogram films is critical.

The device of the present invention comprises a flat rigid plate that is lined with a non-reflective material on both surfaces, so as not to interfere with reading the x-ray mammogram film. The plate has a specialized contoured shape that allows it to best fit the contoured x-ray pattern generated by the different breast tissues on both mediolateral oblique view and craniocaudal view mammogram films.

A lower, larger portion of the plate is shaped in the fashion of the lower portion of a spade, with bilaterally symmetrical lobes and a flared stem. An upper, smaller portion of the plate is trapezoidal shaped, having rounded corners. A medical professional examining a mammogram uses the stem as a handle while positioning the plate so that it obscures certain parts of the mammogram.

The device can be used with both mediolateral oblique (MLO) view and craniocaudal (CC) view mammogram films. The shape of the plate enables the medical professional to cover any of the film representing breast tissues that would otherwise present photographic contrast and adversely affect the viewing of a breast tissue area chosen for examination.

Accordingly, it is a principal object of the invention to provide a device that facilitates accurate reading of mammogram films.

It is another object of the invention to eliminate the contrast created by lighter portions of a mammogram x-ray film, so that an examiner can better view the darker portions.

It is a further object of the invention to feature a contoured shape that better fits the contoured x-ray pattern generated by the different breast tissues.

Still another object of the invention is to allow comparative bilateral image assessment in mammogram films of right and left breasts for detection of unsymmetrical irregularities.

It is also an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
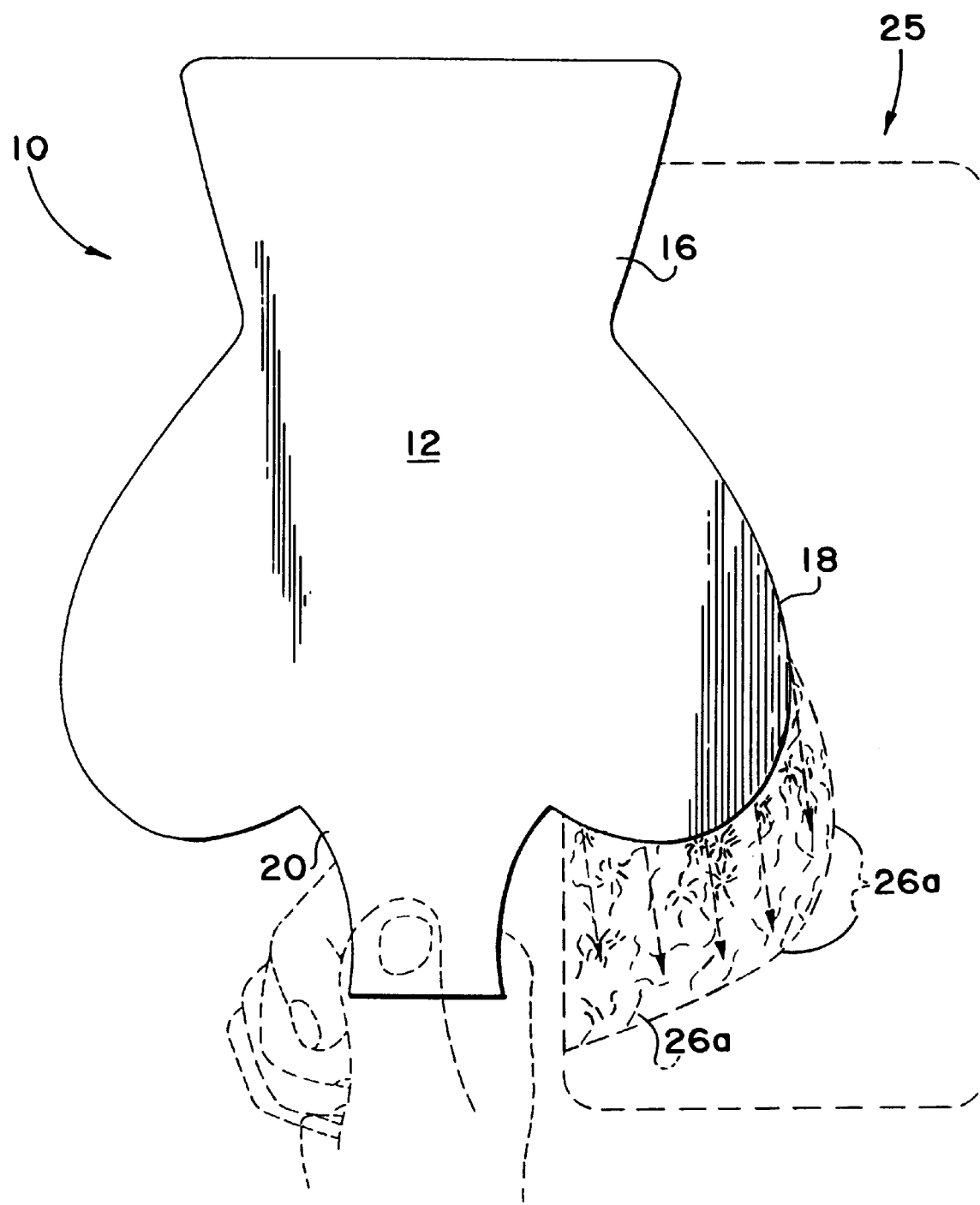
FIG. 1 is a top elevational view of the present invention, positioned on a mediolateral oblique mammogram film of the right breast to facilitate viewing of the superficial subcutaneous tissues.
Figure 2:
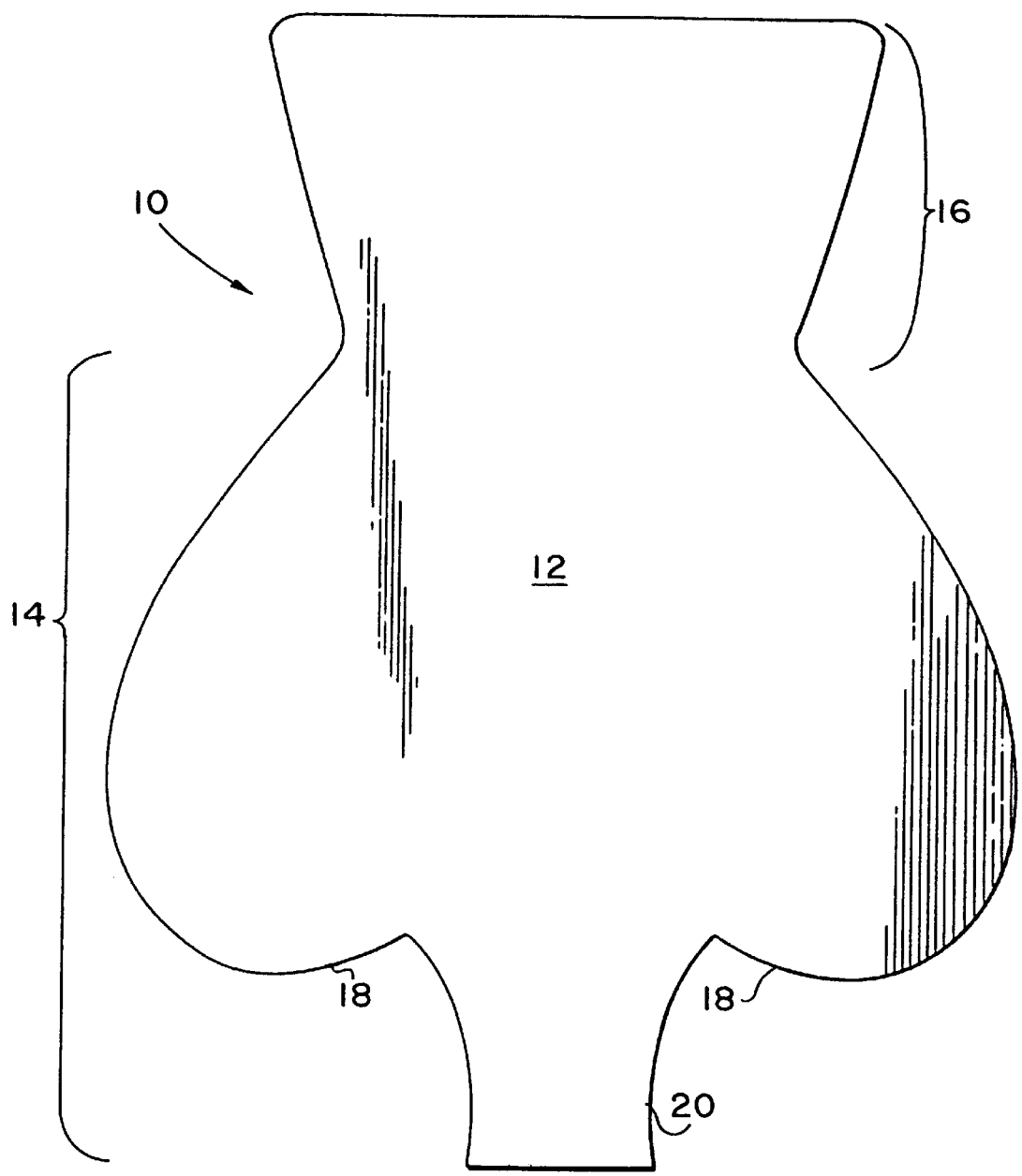
FIG. 2 is a top plan view of the present invention.

The preferred embodiment of the present invention is shown in FIG. 2, is referenced herein by 10 and comprises a flat rigid plate 12. Plate 12 is preferably lined with a nonreflective material on both surfaces, so as not to interfere with reading the x-ray mammogram film. Plate 12 has a specialized contoured shape that allows it to best fit the contoured x-ray pattern generated by the different breast tissues on the mammogram film. Specifically, a lower, larger portion 14 of plate 12 is shaped in the fashion of the lower portion of a spade, with bilaterally symmetrical lobes 18 and a flared stem 20. In addition, an upper, smaller portion 16 of plate 12 is substantially trapezoidal shaped, having rounded corners. Lower and upper portions 14,16 merge along the shorter parallel side of upper portion 16 and the top part of lower portion 18, where lobes 18 terminate. A medical professional using the device 10 to examine a mammogram uses stem 20 as a handle while positioning the device 10 so that lobes 18 and upper portion 16 obscure desired parts of the mammogram, as shown in FIGS. 1, 3B, 3C, 4B, 4C and 4D.

Figure 3A:
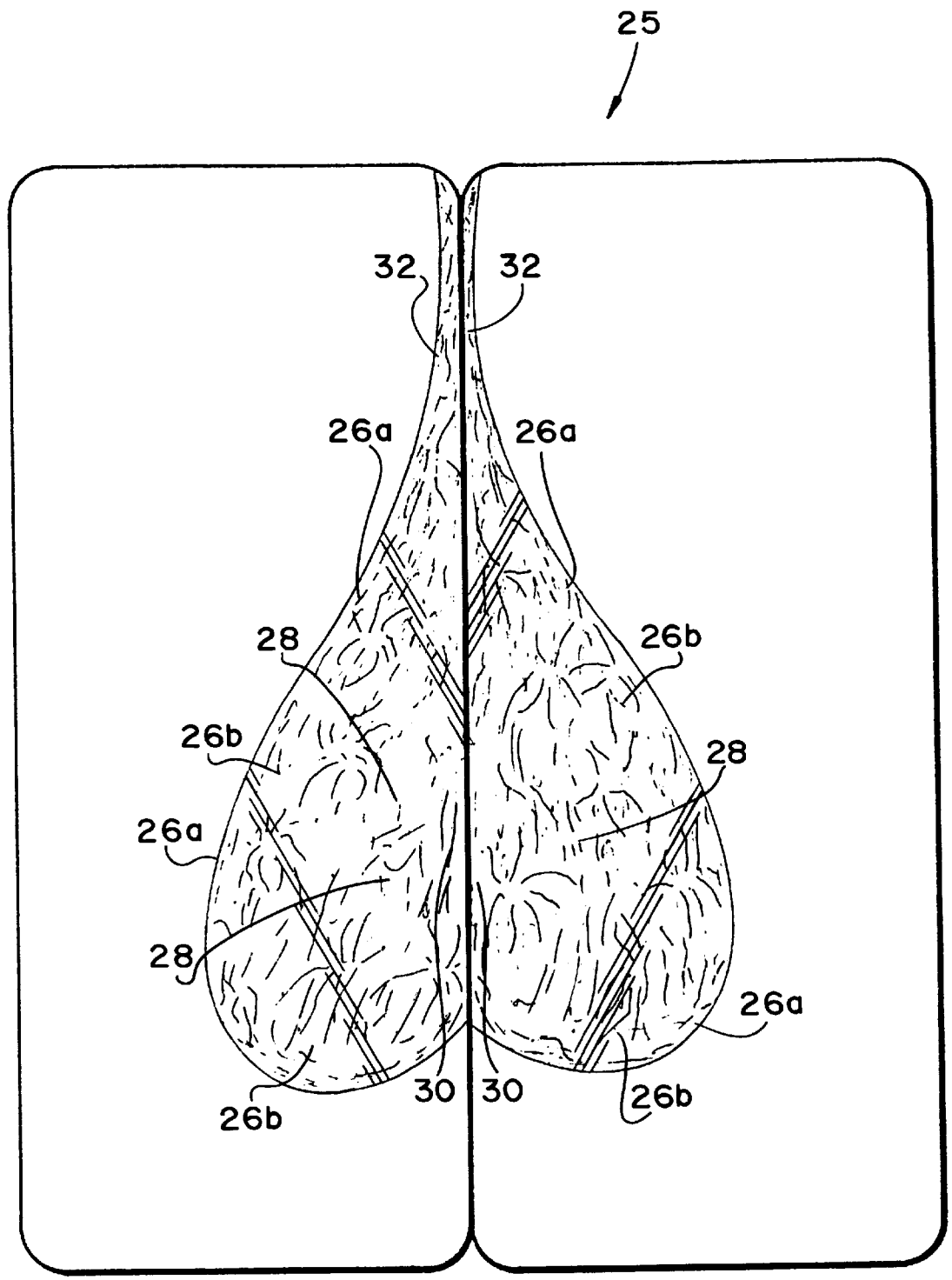
FIG. 3A is a top plan view of a bilateral mediolateral oblique mammogram film.

FIG. 3A shows a mediolateral oblique (MLO) view mammogram 25, which provides a side, profile view of each breast. A physician or radiologist views the films by placing them on a viewbox, where fluorescent light shines through the film to the examiner's eyes. Depending on the density of the object between the x-ray source and the film, which varies with the tissue types present in the breast, various features of breast disease can be recognized. Often, films of the right and left breast are hung "back-to-back," as shown in FIG. 3A. This arrangement facilitates disease recognition, as both breasts are relatively symmetrical and any difference therebetween can be detected and assessed as a possible abnormality.

Figure 3B:
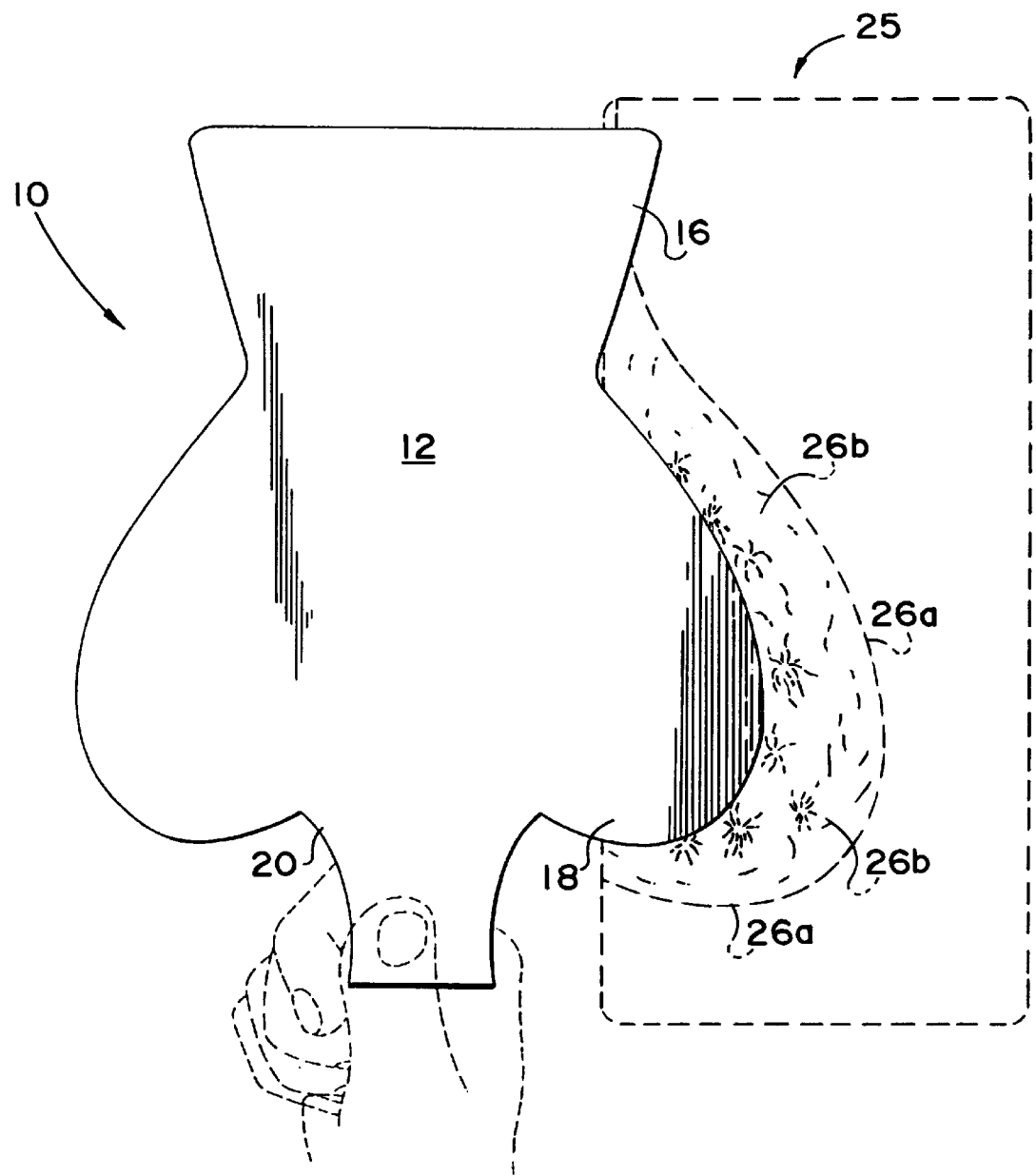
FIG. 3B is a top elevational view of the present invention, positioned on a mediolateral oblique mammogram film of the right breast to facilitate viewing of the deep subcutaneous tissues.
Figure 3C:
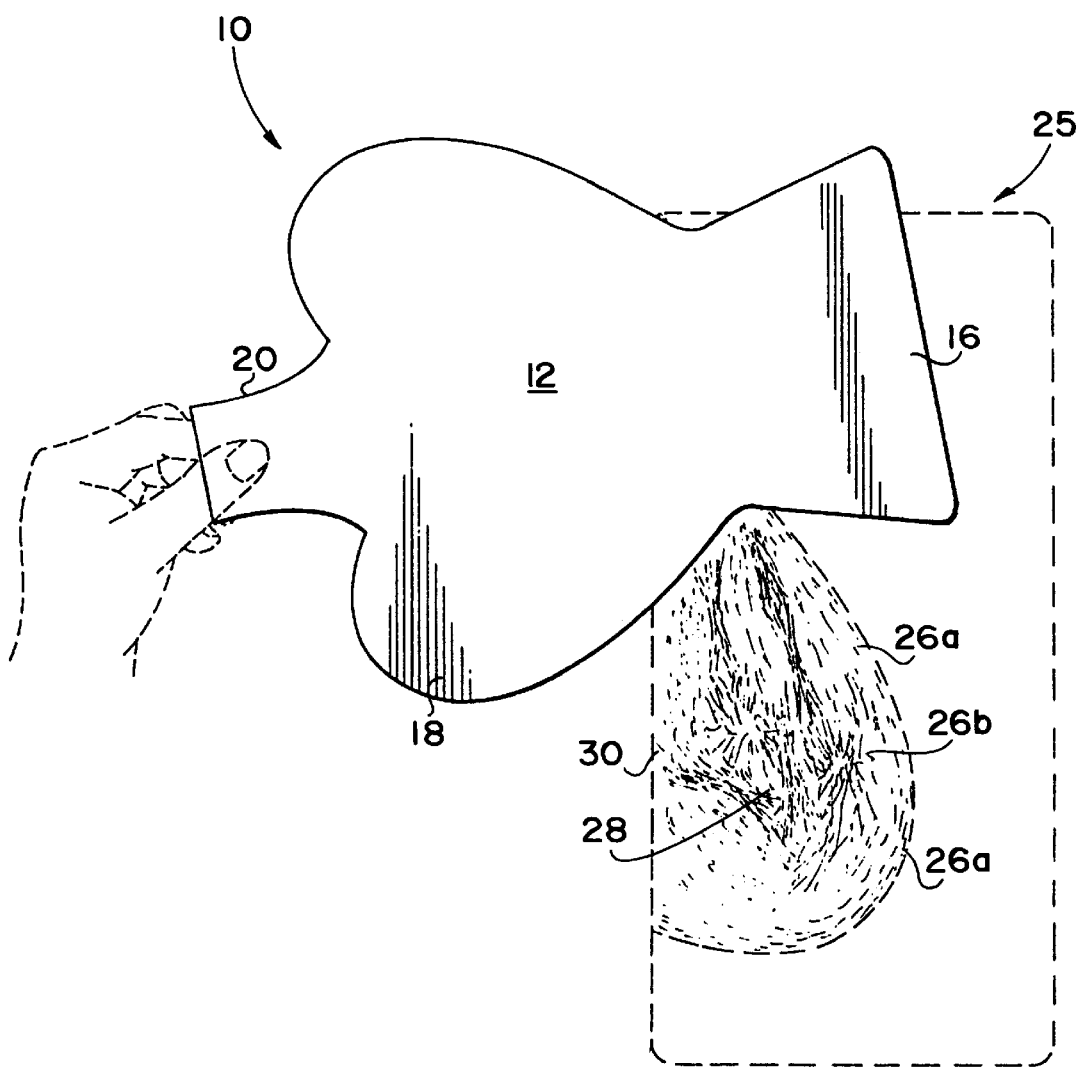
FIG. 3C is a top elevational view of the present invention, positioned on a mediolateral oblique mammogram film of the right breast to facilitate viewing of the subcutaneous, glandular and retroglandular tissues.

The different types of breast tissues represented by the MLO mammogram 25 include superficial and deep subcutaneous tissues 26a, 26b, the glandular tissue 28, the retroglandular tissue 30 and the axilla, or armpit area 32, each of which absorb different levels of x-rays radiation to produce different levels of brightness. FIGS. 1, 3B and 3C illustrate the use of plate 12 to obscure certain radiopaque tissues on the mammogram film of the right breast, so as to better view and analyze other tissues.

In FIG. 1, a medical professional examining the MLO mammogram 25 of the right breast grasps plate 12 at stem 20 and positions it so that lobe 18 and upper portion 16 obscure all of the breast tissues except the superficial subcutaneous tissue 26a, to facilitate more accurate viewing thereof. The arrows in FIG. 1 indicate how the medical professional positions plate 12 in a downward motion with respect to the plane of the MLO mammogram 25, to cover the areas thereof that represent more radiopaque breast tissues that would otherwise present photographic contrast and adversely affect the viewing of the superficial subcutaneous tissue 26a.

Now referring to FIG. 3B, the medical professional positions plate 12 along the MLO mammogram 25 of the right breast so that lobe 18 and upper portion 16 obscure all of the breast tissues except the superficial and deep subcutaneous tissues 26a and 26b, to facilitate more accurate viewing thereof. In doing so, the medical professional covers the more radiopaque areas of the MLO mammogram 25 that would otherwise present photographic contrast and adversely affect the viewing of the superficial and deep subcutaneous tissues 26a,26b.

In FIG. 3C, the medical professional uses plate 12 to cover the axilla, or armpit area 32, which is lighter than the other tissue areas. In doing so, the medical professional eliminates photographic contrast and can accurately view the breast tissues represented on the MLO mammogram, including the superficial and deep subcutaneous tissues 26a,26b, the glandular tissue 28 and the retroglandular tissue 30.

Figure 4A:
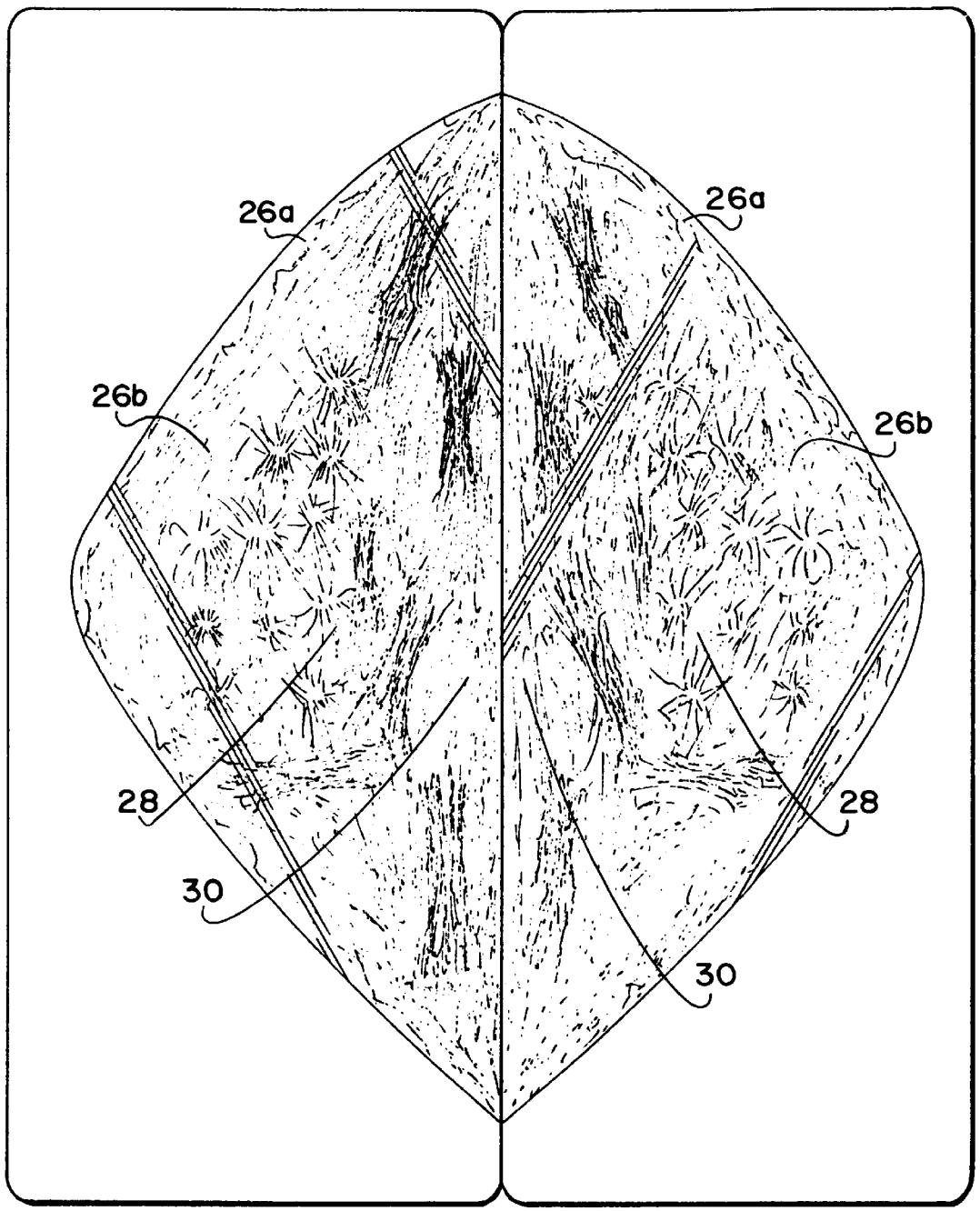
FIG. 4A is a top plan view of a bilateral craniocauclal mammogram film.
Figure 4B:
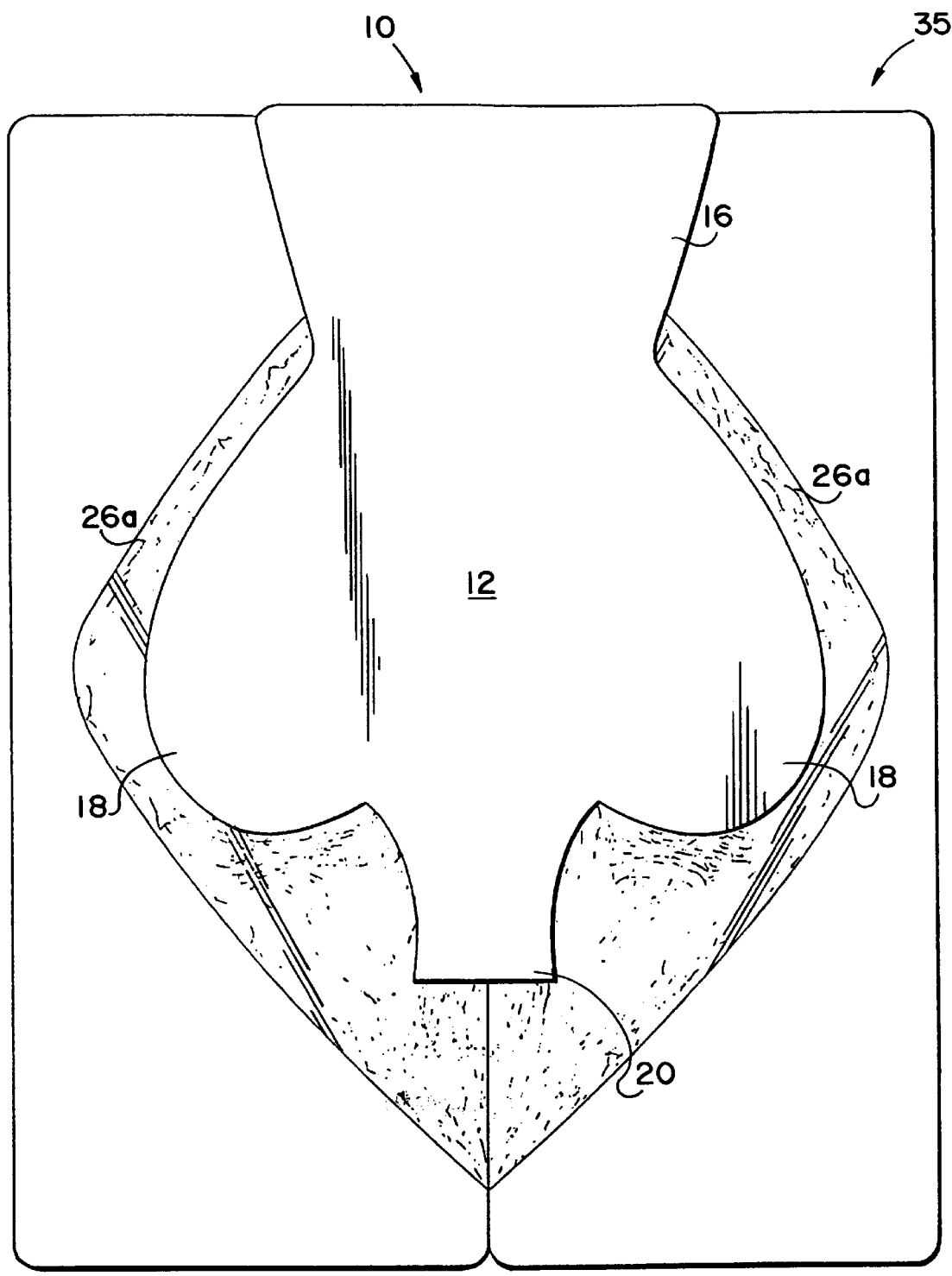
FIG. 4B is a top elevational view of the present invention, positioned on a bilateral craniocaudal mammogram film to facilitaLte viewing of the superficial subcutaneous tissues.
Figure 4C:
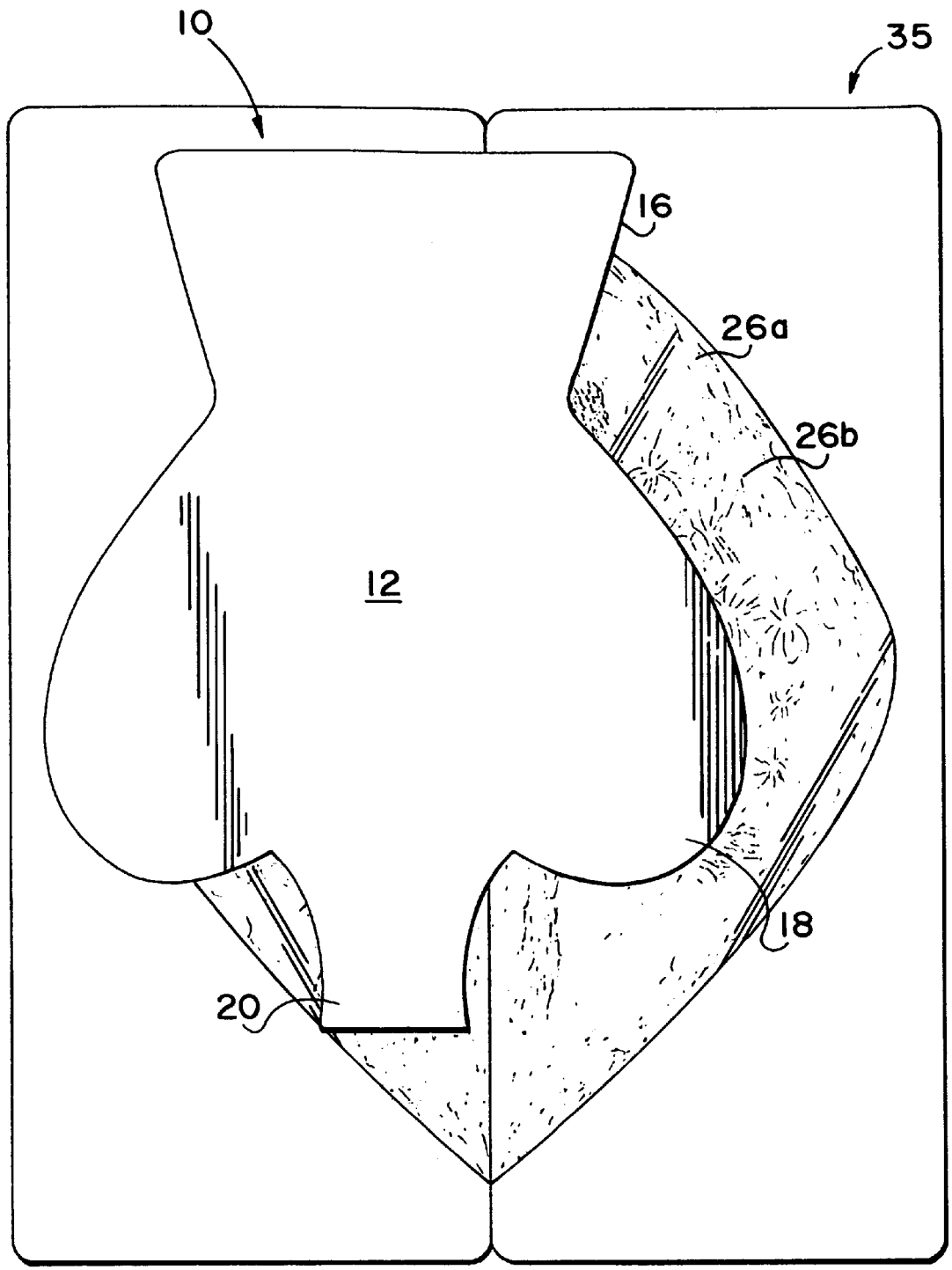
FIG. 4C is a top elevational view of the present invention, positioned on a bilateral craniocaudal mammogram film to facilitate viewing of the deep subcutaneous tissues.
Figure 4D:
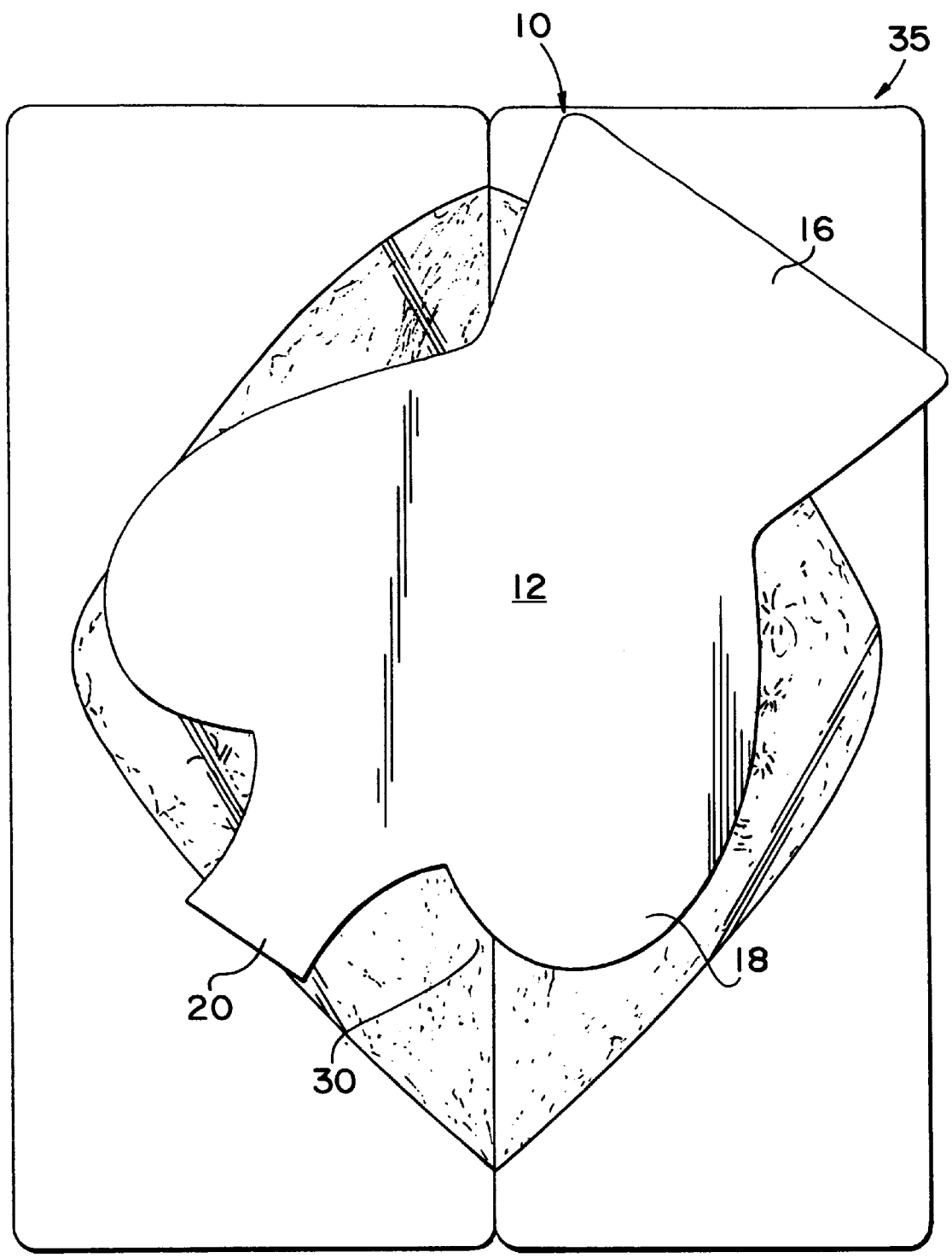
FIG. 4D is a top elevational view of the present invention, positioned on a craniocaudal mammogram film to facilitate viewing of the retroglandular tissues.

FIG. 4A shows a craniocaudal (CC) view mammogram 35, which provides a view of each breast from above, or a "bird's eye" view. A medical professional places the mammogram films of the right and left breast "back-to-back" on the viewbox. The different types of breast tissues represented by the CC mammogram 35 include superficial and deep subcutaneous tissues 26a, 26b, the glandular tissue 28 and the retroglandular tissue 30, each of which absorb different levels of x-ray radiation to produce different levels of brightness. FIGS. 4B, 4C and 4D illustrate the use of plate 12 to obscure certain tissues on the mammogram film, so as to better view and analyze other tissues.

In FIG. 4B, a medical professional examining the CC mammogram 35 positions it so that lobes 18 and upper portion 16 obscure all of the breast tissues except the superficial subcutaneous tissue 26a, to facilitate more accurate viewing thereof. Plate 12 covers the areas of the CC mammograms that represent more radiopaque breast tissues that would otherwise present photographic contrast and adversely affect the viewing of the superficial subcutaneous tissue 26a. The device 10 thereby allows the medical professional to perform a comparative bilateral image assessment for detection of unsymmetrical irregularities.

Now referring to FIG. 4C, the medical professional positions plate 12 along the CC mammogram 35 of the right breast so that lobes 18 and upper portion 16 obscure all of the breast tissues except the superficial and deep subcutaneous tissues 26a and 26b, to facilitate more accurate viewing thereof. In doing so, the medical professional covers the more radiopague areas of the CC mammogram 35 that would otherwise present photographic contrast and adversely affect the viewing of the superficial and deep subcutaneous tissues 26a,26b.

FIG. 4D illustrates placement of plate 12 along the back to back CC mammogram 35 so that lobes 18 and upper portion 16 obscure all of the breast tissues except the retroglandular tissue 30, to facilitate more accurate viewing thereof. In doing so, the medical professional covers the more radiopaque areas of the CC mammogram 35 that would otherwise present photographic contrast and adversely affect the viewing of the retroglandular tissue 30. The device 10 thereby allows the medical professional to perform a comparative bilateral image assessment for detection of unsymmetrical irregularities.

It is to be understood that the present invention is not limited to the sole embodiment described above, but encompasses any and all embodiments within the scope of the following claims.

I claim:

1. A device to aid in the reading of x-ray films comprising:

a) a plate comprising integrally-connected lower and upper portions, said plate being substantially flat and rigid; wherein b) said lower portion is shaped in the fashion of the lower portion of a spade, having bilaterally symmetrical lobes and a stem therebetween;

c) said upper portion is shaped in the manner of a trapezoid and has rounded corners and two opposing sides; and d) said lower and upper portions merge along the two opposing sides of said upper portion and the top part of said lower portion, where said lobes terminate.

2. The device according to claim 1, wherein said stem is flared.

3. The device according to claim 1, wherein said plate is lined with a non-reflective material on both surfaces thereof.

4. A method for using a device to aid in the reading of x-ray films according to claim 1 for reviewing mammogram x-ray films comprising the steps of:

a) hanging mammogram x-ray films of a patient's left and right breasts in a back-to-back formation on a lit viewbox;

b) grasping said device by the stem;

c) placing the device in close proximity to the mammogram films and covering the areas of the mammogram that represent the more radiopaque breast tissues that would otherwise present photographic contrast and adversely affect the viewing of the breast tissue being examined; and d) performing a comparative bilateral image assessment for detection of unsymmetrical irregularities.

5. A hand-held shield comprising a flat, rigid plate having a curvilinear shape, said plate including an upper portion and an integral lower portion, the upper portion being shaped in the manner of a trapezoid having rounded corners with opposing sides, the lower portion being at least partially spade-shaped so as to fit the contoured x-ray pattern generated by the different breast tissues on both mediolateral oblique view and craniocaudal view mammogram films, whereby a medical professional uses said shield to cover the areas of the mammogram that represent the more radiopaque breast tissues that would otherwise present photographic contrast and adversely affect the viewing of the breast tissue being examined due to the transmission of too much light through the film.

6. The shield according to claim 5, wherein said plate is bilaterally symmetrical about the longitudinal axis thereof.

7. The shield according to claim 5, wherein the surfaces of said plate are covered with a nonreflective material in order to reduce the amount of light reflected back to the viewer.

* * * * *